(12) United States Patent
Watson et al.

(10) Patent No.: US 6,775,704 B1
(45) Date of Patent: Aug. 10, 2004

(54) SYSTEM AND METHOD FOR PREVENTING A SPOOFED REMOTE PROCEDURE CALL DENIAL OF SERVICE ATTACK IN A NETWORKED COMPUTING ENVIRONMENT

(75) Inventors: Robert N. M. Watson, Bethesda, MD (US); Olafur Gudmundsson, Washington, DC (US)

(73) Assignee: Networks Associates Technology, Inc., Santa Clara, CA (US)

(*) Notice: Subject to any disclaimer, the term of this patent is extended or adjusted under 35 U.S.C. 154(b) by 838 days.

(21) Appl. No.: 09/750,956

(22) Filed: Dec. 28, 2000

(51) Int. Cl.[7] .............................. G06F 13/00; G06F 9/46
(52) U.S. Cl. ...................... 709/229; 709/230; 719/330
(58) Field of Search ................................. 709/203, 229, 709/230; 719/330; 713/201

(56) References Cited

U.S. PATENT DOCUMENTS 5,802,371 A * 9/1998 Meier .......................... 717/133
5,970,248 A * 10/1999 Meier .......................... 717/125

OTHER PUBLICATIONS

CiscoSystem, Inc., "Configuring TCP Intercept (Prevent Denial of Service Attacks),", PP SC–157–162, (Dec. 1997).*

Check Point Sofware Technologies, Ltd., "TCP SYN Flooding Attack and the Firewall–1 SYNDefender," PP 1–6 (1996).*

* cited by examiner

*Primary Examiner*—Krisna Lim
(74) *Attorney, Agent, or Firm*—Patrick J. S. Inouye; Christopher J. Hamaty

(57) ABSTRACT

A system and method for preventing a spoofed remote procedure call denial of service attack in a networked computing environment is described. A hierarchical protocol stack defines a plurality of communicatively interfaced protocol layers. At least one protocol layer provides a client service via a remote procedure call interface. A request packet sent from a requesting client is intercepted. The request packet contains a service request being sent to a remote server via a remote procedure call. A token uniquely identifying the request packet is generated using data contained therein. The token is included with the request packet. The request packet and the included token is forwarded to the remote server indicated in the remote procedure call. A response packet containing a response sent from a remote server via the remote procedure call interface for the provided client service is received. The response packet is analyzed to determine whether the response packet includes a token uniquely identifying the response packet as having originated from the requesting client for the provided client service.

29 Claims, 10 Drawing Sheets

SYSTEM AND METHOD FOR PREVENTING A SPOOFED REMOTE PROCEDURE CALL DENIAL OF SERVICE ATTACK IN A NETWORKED COMPUTING ENVIRONMENT

FIELD OF THE INVENTION

The present invention relates in general to networked computing environment protection and, in particular, to a system and method for preventing a spoofed remote procedure call denial of service attack in a networked computing environment.

BACKGROUND OF THE INVENTION

Computer networks form a central component of corporate information technology infrastructures. There are two types of networks. A local area network or "intranetwork" is a network operating within a single identifiable location, such as on one floor of a building. Individual computers and shared resources are interconnected over a single media segment. A wide area network or "internetwork" is a network consisting of interconnected intranetworks and geographically distributed computational resources which, when taken as a whole, comprise a unified set of loosely associated computers. The Internet, for example, is a public internetwork interconnecting clients worldwide.

Structurally, most internetworks and intranetworks are based on a layered network model employing a stack of standardized protocol layers. The Transmission Control Protocol/Internet Protocol (TCP/IP) suite, such as described W. R. Stevens, "TCP/IP Illustrated," Vol. 1, Ch. 1 et seq., Addison-Wesley (1994), the disclosure of which is incorporated herein by reference, is a widely adopted network model. Computers and network resources using the TCP/IP suite implement hierarchical protocol stacks that include link, network and transport layers. Protocols operate within each layer to provide point-to-point or end-to-end services.

In addition, client and server end devices implement application protocol layers for providing client services, such as electronic mail, content provision and resource sharing. Application protocols operate in an end-to-end fashion between a requesting client and a responding server. Client services are generally implemented using remote procedure call (RPC) semantics whereby a client sends a request to a server which then returns a response back to the requesting client.

Networked computing environments can be attacked. Networks employing protocols like TCP/IP are susceptible to a class of attacks known as denial of service ("DoS") attacks. The basic objective of DoS attacks is to prevent servers from providing services to legitimate clients by attacking either the servers directly or the network infrastructure supporting the servers. One specific DoS attack attempts to overwhelm a victim server with a flood of network traffic. In a direct flood attack, the victim server is inundated with packets more rapidly than responses can be generated. In an indirect flood attack, the infrastructure supporting the victim server is saturated with packets, effectively blocking legitimate traffic from reaching the victim server.

RPC semantics can be misused to affect flood attacks through source address spoofing. In a spoofed flood attack, an attacking system issues a request to one or more servers using the network address of an intended victim server as the source address of the request. Upon receiving the spoofed request, the receiving servers send their replies back to the victim server under the assumption that the request originated from the spoofed source address. The wave of replies sent to the victim server increase the load on both the network path to the victim server and on the victim server itself.

The impact of a spoofed DoS attack can be enhanced through amplification, which can occur when more than one server is willing to respond to the same request. Amplification can also be achieved when a "stooge" server is willing to respond to a single request packet with more than one packet. Amplification can be used to attack a victim server by causing multiple "stooge" computers to generate a flood of unsolicited response packets.

In the prior art, firewalls have traditionally provided a first line of defense against attacks. Firewalls are placed at the boundary separating an intranetwork from a public internetwork and prevent network compromise by unauthorized users through packet filtering, stateful inspection and rate limiting. Packet filtering requires a firewall to maintain a list of unauthorized source addresses. The source addresses of incoming packets are checked against the list. Only packets originating from authorized source addresses are allowed entry into the intranetwork. However, packet filtering is time consuming and resource intensive and can act as a bottleneck to incoming traffic. More importantly, spoofed request packets are indistinguishable from legitimate traffic and effectively evade packet filtering.

Stateful inspection requires a firewall to keep track of outgoing service requests. Incoming responses are matched to the tracked requests to prevent unsolicited responses from entering the intranetwork. However, stateful inspection is also resource intensive and can fail when the state allocated for request tracking is exceeded.

Routers and similar border devices are also used to protect against attacks. Some routers limit the rate of response packets flowing through to the intranetwork. Response packets are dropped when traffic levels reach some pre-defined threshold. However, rate limiting is primarily used to provide an acceptable quality of service to the underlying network infrastructure and indiscriminately drops both legitimate and malicious network traffic.

Therefore, there is a need for a solution to providing protection against spoofed RPC flood DoS attacks in networked computing environments, particularly TCP/IP-based environments. Preferably, such a solution would recognize unsolicited service responses in a discriminating, protocol-independent manner. Moreover, such an approach would operate efficiently without performing resource-intensive list checking nor requiring state to be maintained.

SUMMARY OF THE INVENTION

The present invention provides a stateless system and method for protecting a networked computing environment against spoofed remote procedure call (RPC) denial of service (DoS) attacks. An authentication system intercepts service requests from requesting clients. If the type of service request is recognized, a token is generated from data contained in the service request. The service request is then forwarded along with the token. The token is either embedded within the service request or added onto the end of the packet. The authentication system intercepts service responses from responding servers. The service response is analyzed, if of a recognized type. The individual fields within the token are validated and, if valid, the response packet is forwarded to the requesting client. Invalid responses are discarded.

An embodiment of the present invention is a system and method for preventing a spoofed remote procedure call denial of service attack in a networked computing environment. A hierarchical protocol stack defines a plurality of communicatively interfaced protocol layers. At least one protocol layer provides a client service via a remote procedure call interface. A request packet sent from a requesting client is intercepted. The request packet contains a service request being sent to a remote server via a remote procedure call. A token uniquely identifying the request packet is generated using data contained therein. The token is included with the request packet. The request packet and the included token is forwarded to the remote server indicated in the remote procedure call. A response packet containing a response sent from a remote server via the remote procedure call interface for the provided client service is received. The response packet is analyzed to determine whether the response packet includes a token uniquely identifying the response packet as having originated from the requesting client for the provided client service.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
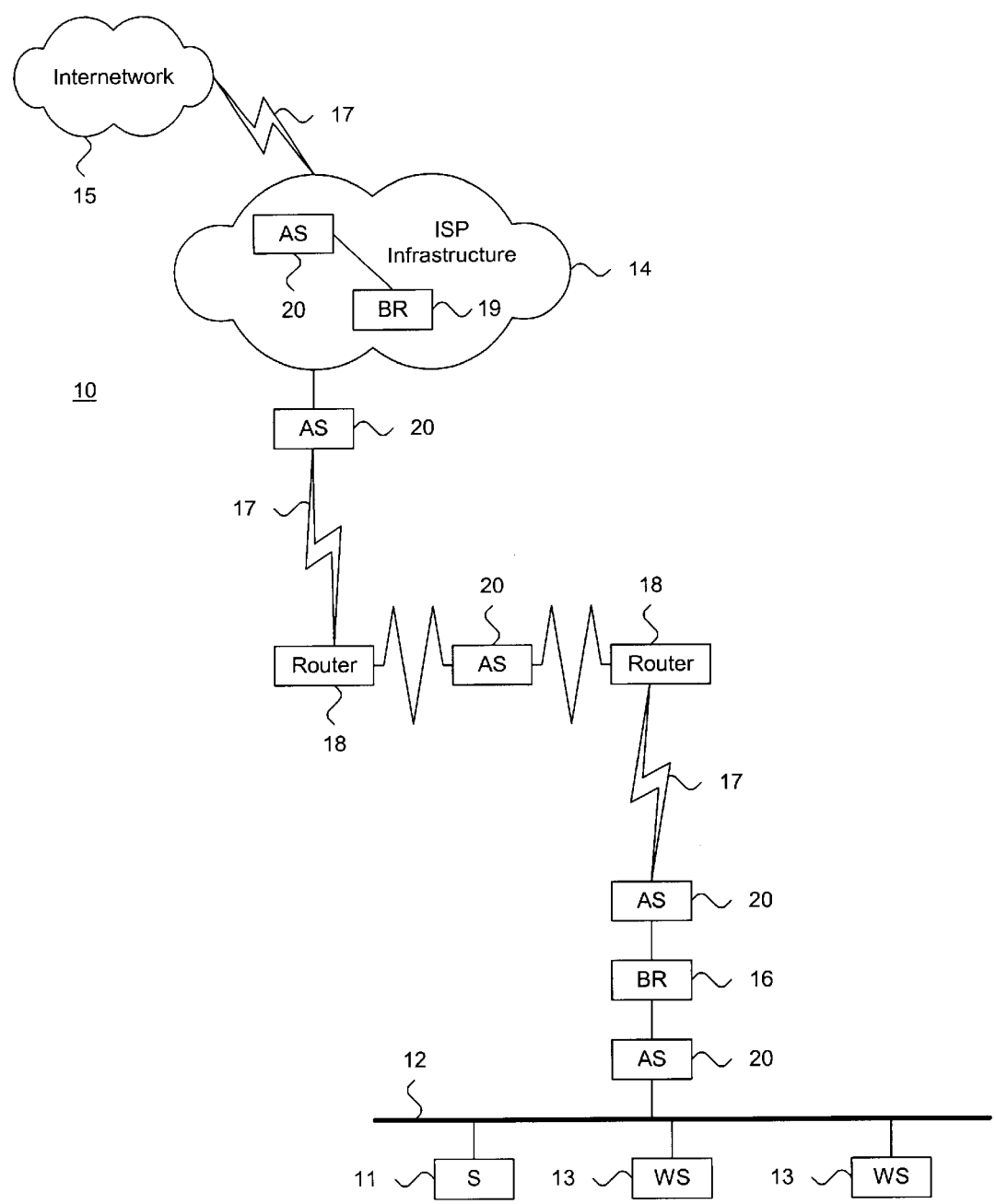
FIG. 1 is a block diagram showing a networked computing environment, including a system for preventing a spoofed remote procedure call (RPC) denial of service (DoS) attack, in accordance with the present invention.

FIG. 1 is a block diagram showing a networked computing environment 10, including a system for preventing a spoofed remote procedure call (RPC) denial of service (DoS) attack, in accordance with the present invention. The environment 10 includes a intranetwork 12 interconnected with an internetwork 15, such as the Internet, by means of an Internetwork Service Provider (ISP) infrastructure 14. The intranetwork 12 includes a local server 11 (S) with a plurality of workstations (WS) 13 and similar network resources. Internally, the ISP infrastructure 14 includes a plurality of network service support machines, include high bandwidth routers, servers, and related support equipment, as is known in the art.

The intranetwork 12 interfaces to the internetwork 15 through a series of high-and low-bandwidth connections. A high-bandwidth connection 17 connects the intranetwork 12 to a pair of routers 18 which exchange data over low-bandwidth commercial lines. The intranetwork 12 interfaces to the high-bandwidth connection 17 through a border router 16 (BR) or similar device. Similarly, the ISP infrastructure 14 interfaces to the router 18 over a high-bandwidth connection 17 through a border router 19.

Both the ISP infrastructure 14 and server 11 are susceptible to denial of service (DoS) attacks, particularly flood attacks, as further described below with respect to FIG. 2. As protection against DoS attacks, an authentication system 20 (AS) can be placed at various locations within the distributed computing environment 10, including within the ISP infrastructure 14, between the ISP infrastructure 14 and a router 18, between the pair of routers 18, between a router 18 and a border router 16, and between the border router 16 and the intranetwork 12. Each authentication system 20 prevents the misuse of network protocols and remote procedure call (RPC) semantics by authenticating responses against tokenized requests, as further described below beginning with reference to FIG. 4. Authentication systems 20 deployed further "upstream" are most effective at protecting against floods in general.

The individual computer systems 11 and 13 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
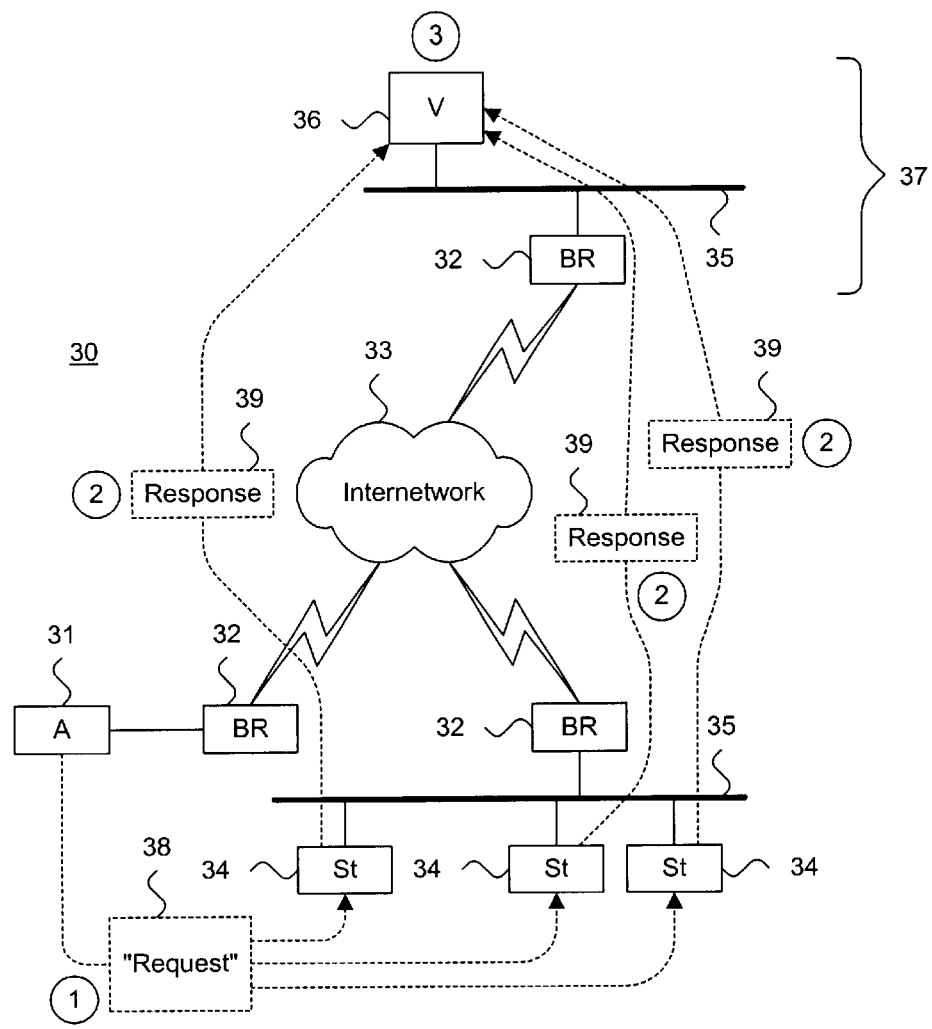
FIG. 2 is a network diagram illustrating, by way of example, the progression of a spoofed RPC attack.

FIG. 2 is a network diagram illustrating, by way of example, the progression of a spoofed RPC attack 30. A spoofed RPC attack is a form of flood DoS attack that misuses network protocol and remote procedure call semantics for malicious purposes. Generally, the goal of any flood attack is to overwhelm the either a victim server 36, or the components comprising the infrastructure 33, 37 supporting the victim server 36, with traffic to the point of saturation. Typically, one or more component within the infrastructure 33, 37 is the weakest link and becomes saturated with traffic. Once saturated, the component can no longer serve traffic to the victim server 36. Spoofed RPC attacks flood a victim server 36 with unsolicited responses 39 using service requests 38 sent to third party "stooge" computers 34. The service requests 38 are spoofed by identifying the victim server 36 as the service requester instead of the attacker 31 from whom the service requests 38 originated.

As will be recognized by one skilled in the art, the attacker 31, stooge computers 34 and victim server 56 can each be a client, host or server system, or any machine capable of generating a request or response packet, as well as combinations thereof. These terms are frequently used interchangeably, depending upon the computational environment, and express references to clients, servers and hosts should not be viewed out of context as being limiting or restrictive to any particular type of device.

Flood attacks occur most frequently in Transmission Control Protocol/Internet Protocol (TCP/IP) compliant computing environments that include a combination of intranetworks 35 interconnected via an internetwork 33. The components which comprise the infrastructure 37 for the victim server 36 consist of the border router 32 and intranetwork 35, plus the internetwork 33. The individual networks 33, 35 are interconnected using conventional low- and high-bandwidth carriers interfaced via border routers 32 or similar devices. Other network topologies and configurations are deployed; this example serves to highlight one possible configuration and an attack thereupon.

Prior to beginning a spoofed RPC attack, an attacker 31 selects a victim server ("V") 36. A spoofed service "request" 38 containing the address of the victim server 36 is sent from the attacker 31 (step ①) to a set of stooge computers 34 ("St"). The stooge computers 34 each respond to the "request" 38 by sending a response 39 (step ②). At some point, either the victim server 36 or the infrastructure 33, 37 becomes saturated with traffic (step ③) and is therefore unable to serve traffic being sent to the victim server 36.

Flood attacks rely on routable protocols to propagate the attack. Any routable protocol can be used, but generally flood attacks rely on the User Datagram Protocol (UDP), Internet Control Message Protocol (ICMP), and TCP protocols. In addition, one variety of flood attack, known as a distributed denial of service (DDOS) attack, utilizes network broadcast messages to amplify the impact of the attack. The attacker 31 sends a spoofed request packet to a broadcast address to which one or more stooge computers 34 will respond. Thus, the effect of the attack is amplified by increasing the net number of responses generated for each bogus service request.

Figure 3:
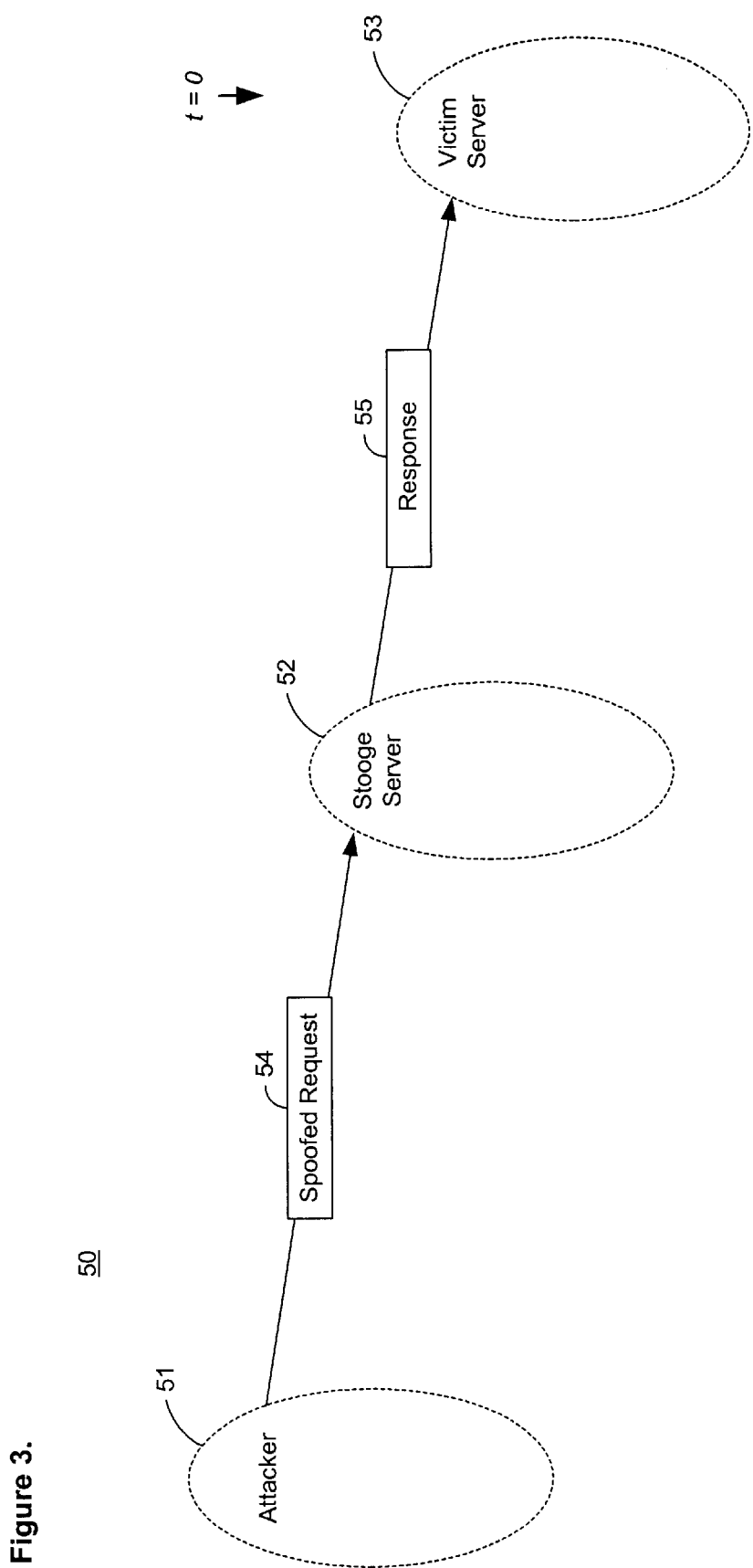
FIG. 3 is a timing diagram showing, by way of example, the spoofed RPC attack of FIG. 2.

FIG. 3 is a timing diagram 50 showing, by way of example, the spoofed RPC attack of FIG. 2. The attacker 51 creates a spoofed request 54 that is sent to one or more stooge computers 52. The stooge computers 52 respond to the spoofed request 54 by sending a response 55 to the system identified in the source address of the spoofed request 54. Since the victim server 53 is identified, the response 55 is sent to the victim server 53.

Figure 4:
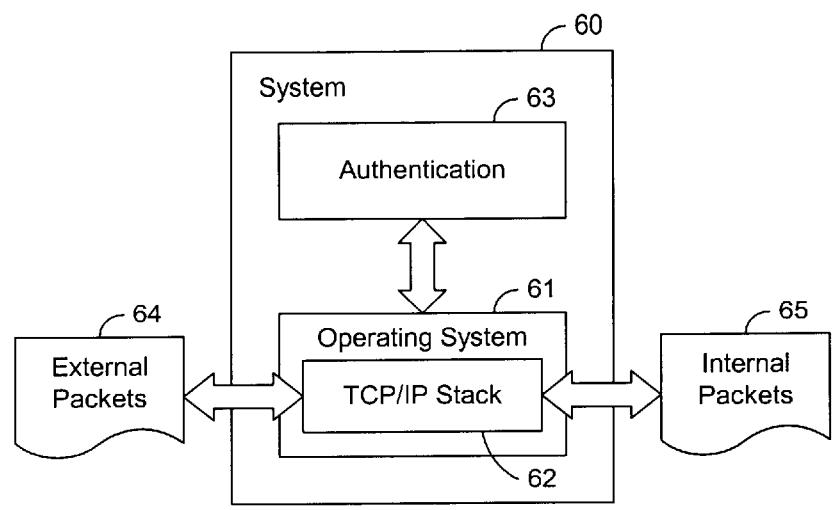
FIG. 4 is a block diagram showing an authentication system for preventing a spoofed RPC attack for use in a networked computing environment.

DoS attacks, particularly flood attacks, rely on basic assumptions made in the underlying network protocols. The stooge computers assist the attacker in achieving a malicious end merely by performing their ordinary tasks. Moreover, the packets used in attacking a victim server or network infrastructure resemble bona fide, legitimate traffic. Consequently, DoS attacks are extremely difficult to detect when examining individual packets. FIG. 4 is a block diagram showing an authentication system 60 for preventing a spoofed RPC attack for use in a networked computing environment. The authentication system 60 counters spoofed RPC attacks by generating a token, as further described below with reference to FIG. 6, that uniquely identifies each service request originating from within the networked computing environment. The token is included with the service request and only those service responses that include a valid token are received back into the networked computing environment. Unlike a firewall, the system 60 focuses on preventing the misuse of network protocols and RPC semantics rather than on affirmatively combating security policy violations.

In the described embodiment, the system 60 is a programmed digital computer executing an authentication application 63 for preventing spoofed RPC attacks, as further described below with reference to FIG. 7. As is conventional in the art, the system 60 operates under the control of an operating system 61, such as the Unix or Windows NT operating systems. A TCP/IP stack 62 executes in kernel memory space and interfaces directly to the network media.

Preferably, the system 60 is placed at or in front of a boundary separating an internal network from an external network so all service-related traffic can be checked by the authentication application 63. Internal packets 65 and external packets 64 efficiently pass through the system 60. No internal state is maintained by the system 60. Internal packets 65 containing recognized service requests are intercepted and a token is generated based on data contained within the request packet. The token is included with the request packet and forwarded as an external packet 64. External packets 64 containing service responses are intercepted and analyzed to determine whether the response packet includes a token uniquely identifying the response packet as having originated from within the internal network. The tokens are stripped off authenticated serviced responses and forwarded as an internal packet 65. Unauthenticated responses are dropped.

Figure 5:
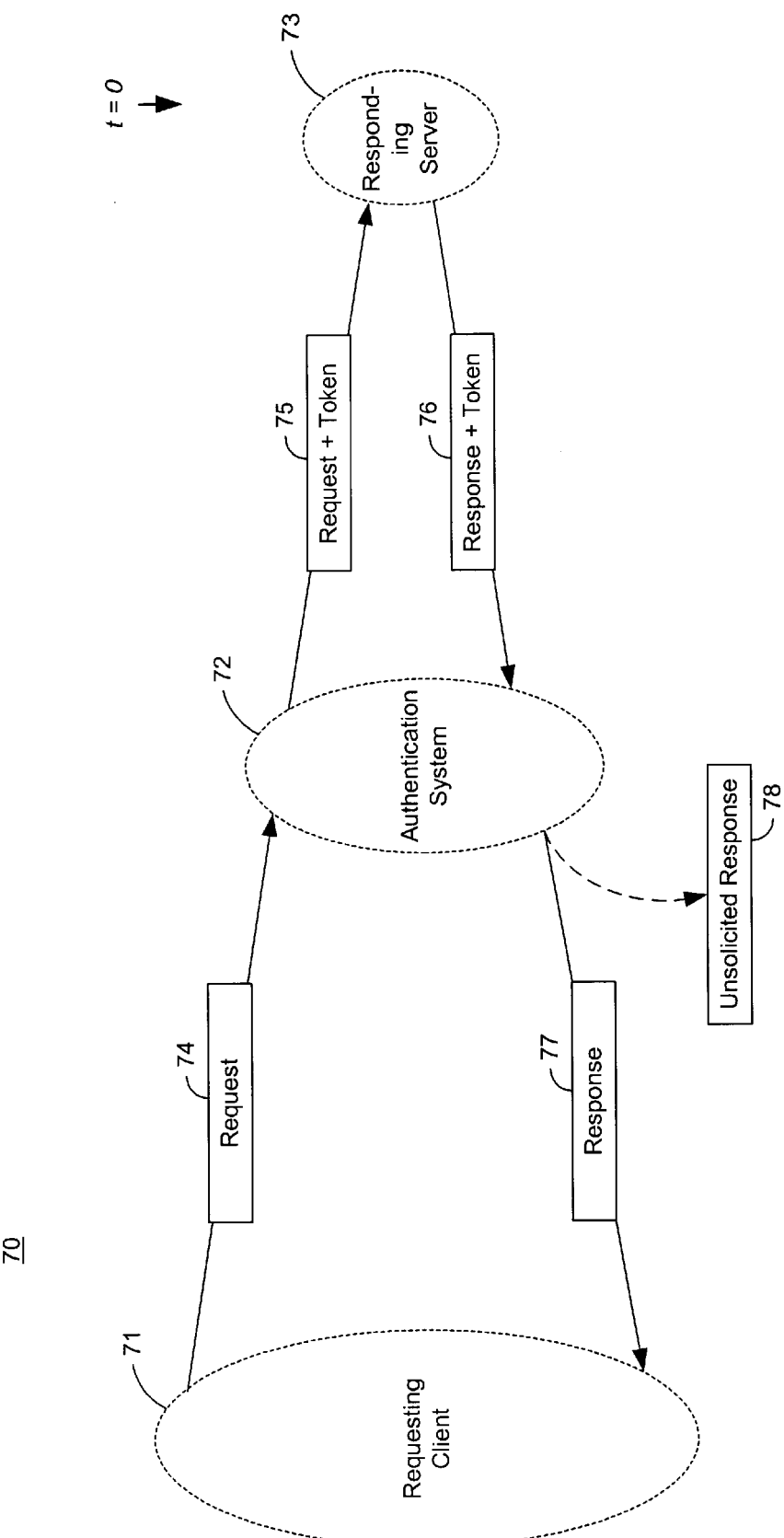
FIG. 5 is a timing diagram showing, by way of example, the authentication of RPC packets using the authentication system of FIG. 4.

FIG. 5 is a timing diagram 70 showing, by way of example, the authentication of RPC packets using the authentication system 60 of FIG. 4. Each of a requesting client 71, the authentication system 72, and a responding server 73 define a hierarchical protocol stack (not shown) that includes a plurality of communicatively interfaced protocol layers, such as an TCP/IP protocol stack. At least one of the protocol layers, preferably at an application level, provides services. The responding server 73 exports an RPC interface via which the requesting client 71 can request services.

During operation, the requesting client 71 sends an RPC request packet 74 to the responding server 73. The request packet 74 is intercepted by the authentication system 72 which generates a token using data included in the request packet 75. The token is added in such a manner that the token will be included as part of the response from the responding server 73.

The request packet and token 75 are forwarded to the responding server 73. The responding server 73 performs the requested service and sends back a response packet and the token 76 to the requesting client 71. The response packet and token 77 are again intercepted by the authentication system 72. The authentication system 72 analyzes the response packet and token 76 and, if valid, forwards the response 77, sans token, to the requesting client 71. If the token is invalid, or if the response packet is unsolicited, that is, was not requested by the requesting client 71, the unsolicited response 78 is discarded.

In the described embodiment, two protocols and three specific types of request packets are supported. First, the Internet Control Message Protocol (ICMP) and Domain Name System protocol are supported. ICMP and DNS are described in W. R. Stevens, "TCP/IP Illustrated," Vol. 1, Chs. 6, 7 and 14, Addison-Wesley (1994), the disclosure of which is incorporated herein by reference. The three request packets supported are the ICMP echo request, ICMP timestamp request, and DNS request. Tokens are added onto the end of the ICMP echo request and timestamp request packets, while tokens are embedded into the headers of DNS request packets. Other protocols and request packet types could also be supported, as would be recognized by one skilled in the art.

Figure 6:
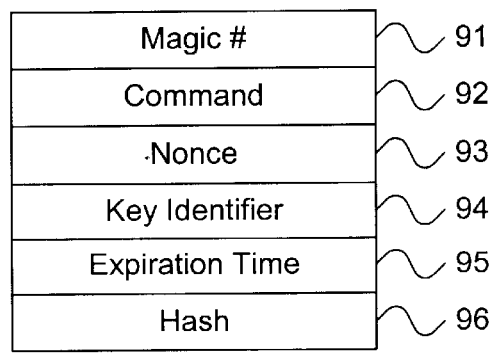
FIG. 6 is a data structure diagram of a token used to authenticate RPC packets.

FIG. 6 is a data structure diagram of a token 90 used to authenticate RPC packets. The token 90 consists of six fields: a magic number 91, command 92, nonce value 93, key identifier 94, expiration time 95, and hash value 96.

The magic number 91 is a randomly selected value, preferably 32-bits in length, that is unique to each authentication system 60. The magic number 91 is selected from a set of rotating values.

The command field 92 is used to distinguish between intercepted packets and those packets originating with the authentication system 60. Although the authentication system 60 is functionally transparent from the perspective of the requesting client 71 and responding server 73 (shown in FIG. 5), the authentication system 60 may itself need to generate requests and receive responses. The command field 92 allows this capability to function.

The nonce value 93 is a unique value, also preferably 32-bits in length, that identifies a given request. The nonce value 93 is randomly selected, preferably using a cryptographic technique. The nonce value 93 prevents replay attacks or attacks on the key material included in the token 90.

The key identifier 94 specifies the rotating key used by the authentication system 60 in generating the token 90.

The expiration time 95 consists of a date and time stamp. The expiration time 95 prevents replay attacks if the token is older than five to twenty seconds. Other expiration times and liveness techniques could be used.

Finally, the hash value 96 is preferably cryptographically generated from the source and destination IP addresses, the protocol type of the request 74, fields 91, 93 and, optionally, fields 92, 94, 95. The hash value 96 is 32-bits in length. In the described embodiment, the hash value 96 is calculated using a secure cryptographic processing procedure, such as the Secure Hash Algorithm-1 (SHA-1), described in the Federal Information Processing Standards Publication, No. 180-1, or Message Authentication Code (MAC), described in the Federal Information Processing Standards Publication, No. 113.

Figure 7:
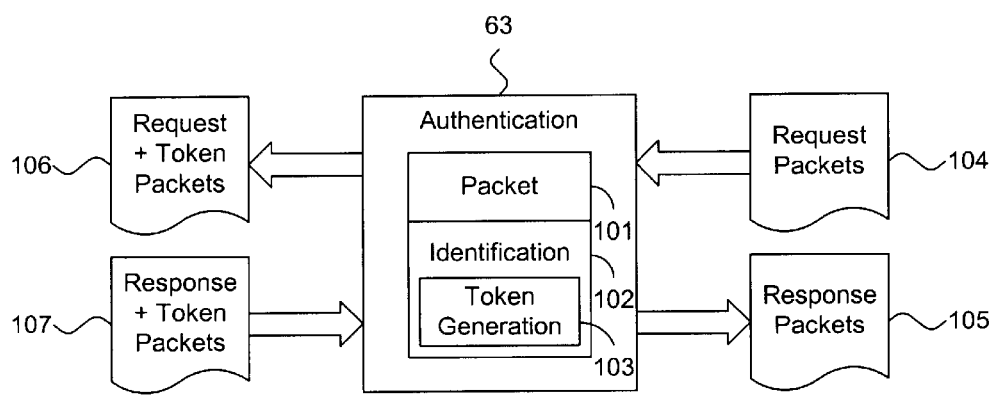
FIG. 7 is a block diagram showing the functional software modules of the authentication system of FIG. 4.

FIG. 7 is a block diagram showing the functional software modules of the authentication system 63 of FIG. 4. The authentication system 63 consists of three main modules: packet 101, identification 102, and token generation 103. Each module is a computer program or module written as source code in a conventional programming language, such as the C programming language, and is presented for execution by the CPU as object or byte code, as is known in the art. The various implementations of the source code and object and byte codes can be held on a computer-readable storage medium or embodied on a transmission medium in a carrier wave. The authentication system 63 operates in accordance with a sequence of process steps, as further described below beginning with reference to FIG. 8.

The packet module 101 performs packet housekeeping chores, including interfacing to the TCP/IP stack 62 (shown in FIG. 4) and parsing header information from incoming packets. The identification module 102 performs non-token specific packet processing, including determining whether a packet is recognized, whether a response packet contains a token, stripping a token from a packet, and so forth. Finally, as a submodule of the identification module 102, the token module 103 actually generates a token, as further described below with reference to FIG. 11.

Figure 8:
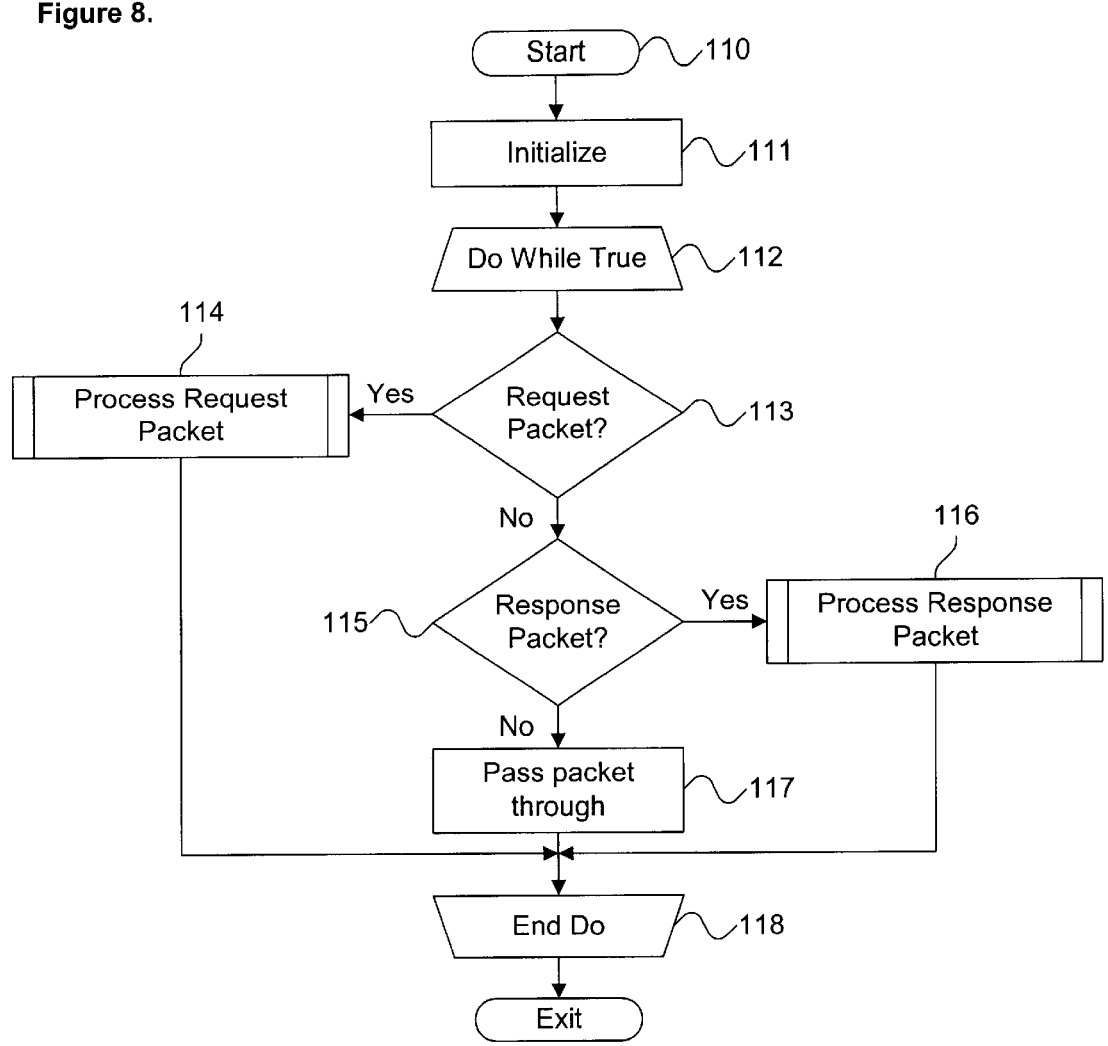
FIG. 8 is a flow diagram showing a method for preventing a spoofed remote procedure call denial of service attack in a networked computing environment in accordance with the present invention.

FIG. 8 is a flow diagram showing a method for preventing a spoofed remote procedure call denial of service attack 110 in a networked computing environment in accordance with the present invention. The method 110 operates in two phases. During the first phase, initialization (block 111), the operating system 61 and TCP/IP stack 62 and authentication system 63 (shown in FIG. 4) are started and their associated data structures initialized.

During the second phase, operation (blocks 112–118), packets are iteratively processed as follows. If an incoming packet is a request packet 104 (shown in FIG. 7) (block 113, a routine for processing request packets is called (block 114, as further described below with reference to FIG. 9. If the incoming packet is a response packet 107 (block 115), a routine for processing response packets is called (block 116), as further described below with reference to FIG. 10. Otherwise, if the incoming packet is neither a request packet nor a response packet, the packet is allowed to pass through (block 117 . The iterative loop (blocks 112–118) is repeated for each new packet. The method 110 terminates upon the unloading of the authentication system 63 or upon shutdown of the system 60.

Figure 9:
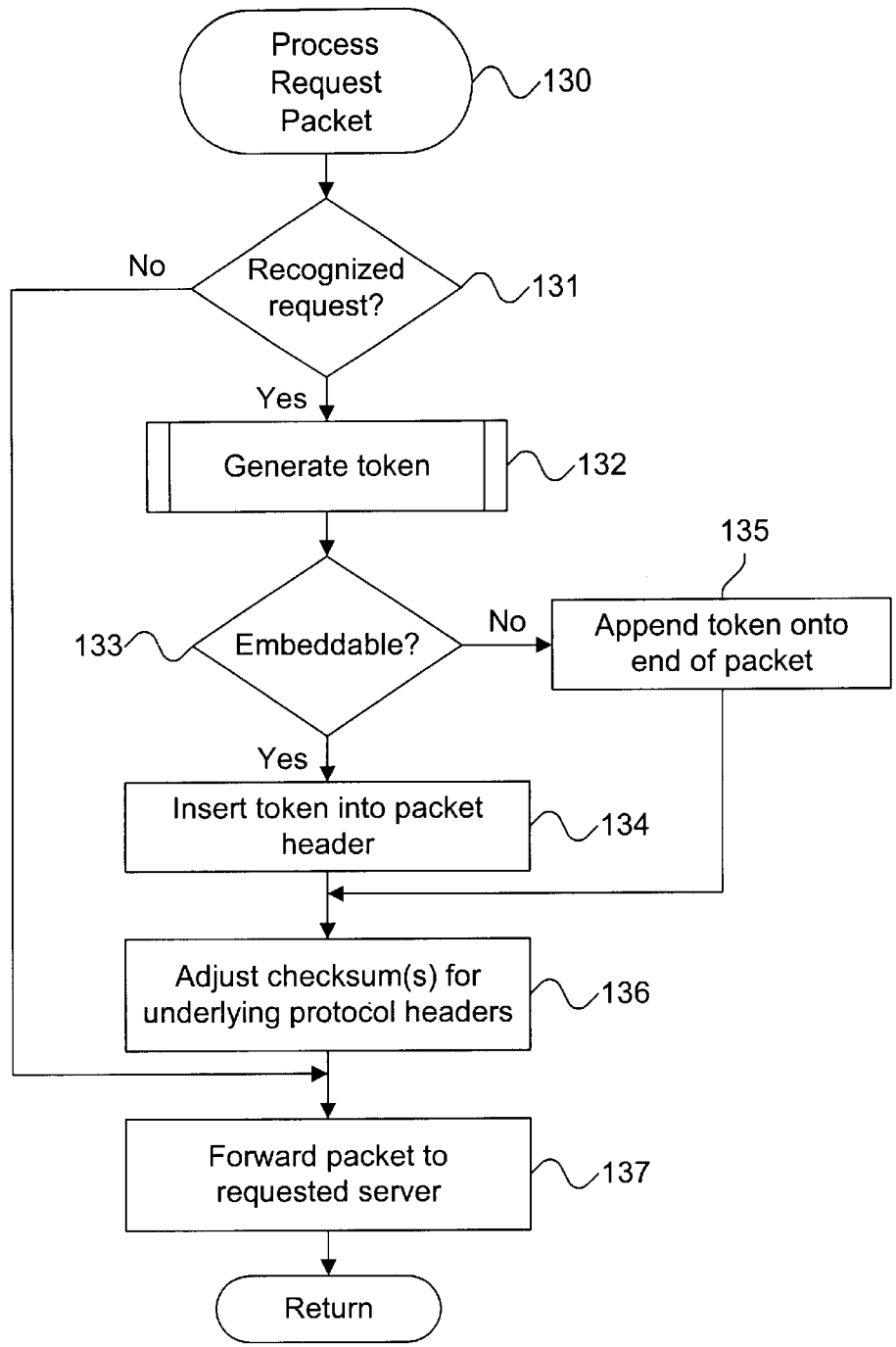
FIG. 9 is a flow diagram showing a routine for processing request packets for use in the method of FIG. 8.

FIG. 9 is a flow diagram showing a routine for processing request packets 130 for use in the method 110 of FIG. 8. The purpose of this routine is to generate tokens 90 for recognized service requests. If a request packet 104 does not correspond to a recognized service (block 131), the request packet 104 is forwarded without further action (block 137) and the routine returns.

Otherwise, if the request is recognized (block 131), a token 90 is generated (block 132), as further described below with reference to FIG. 11. If the request packet 104 uses a protocol allowing the token to be embedded within the request packet itself (block 133), the token is inserted into the packet header (block 134). Otherwise, the token is appended onto the end of the request packet 104 (block 135). In the described embodiment, tokens are appended onto the end of ICMP request packets and embedded into the headers of DNS request packets. Finally, the checksums for any underlying protocol headers, such as IP or TCP, are adjusted to accommodate the addition of the token 90 (block 136). The request packet and token 106 (shown in FIG. 7) is then forwarded (block 137). The routine then returns.

Figure 10:
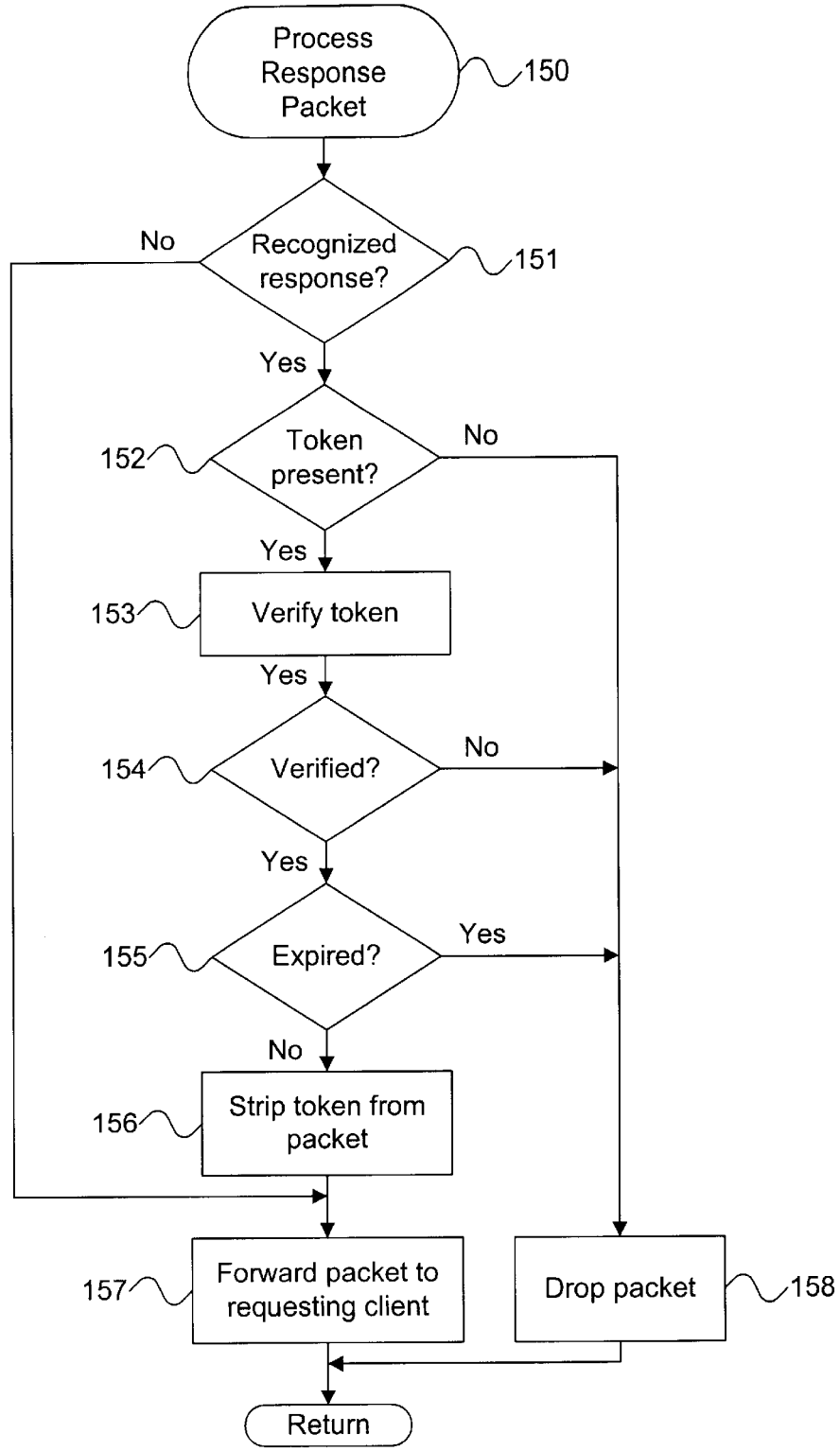
FIG. 10 is a flow diagram showing a routine for processing response packets for use in the method of FIG. 8.

FIG. 10 is a flow diagram showing a routine for processing response packets 150 for use in the method 110 of FIG. 8. The purpose of this routine is to analyze any identified tokens 90 included with recognized response packets. As before, if a response packet 107 does not correspond to a recognized service (block 151), the response packet 107 is forwarded without further action (block 157) and the routine returns.

Otherwise, if the response is recognized (block 151) and a token 90 is included with the response packet 107 (block 152), the token 90 is verified (block 153). Response packets for recognized services which do not include a token 90 (block 152) are discarded (block 158). Token verification requires reproducing the hash value 96 (shown in FIG. 6) based on data contained in the response packet 107 and comparing the results. If the token 90 is verified (block 154) and has not expired (block 155), the token 90 is stripped from the response packet 107 (block 156). Response packets 107 that include tokens 90 which do not verify (block 154) are discarded (block 158). Similarly, response packets 107 that have expired (block 155) are likewise discarded (block 158). In the described embodiment, an adjustable expiration time of five to twenty seconds is used, although any other expiration time could be used. Finally, the response packet 105 (shown in FIG. 7), sans token 90, is then forwarded (block 157). The routine then returns.

Figure 11:
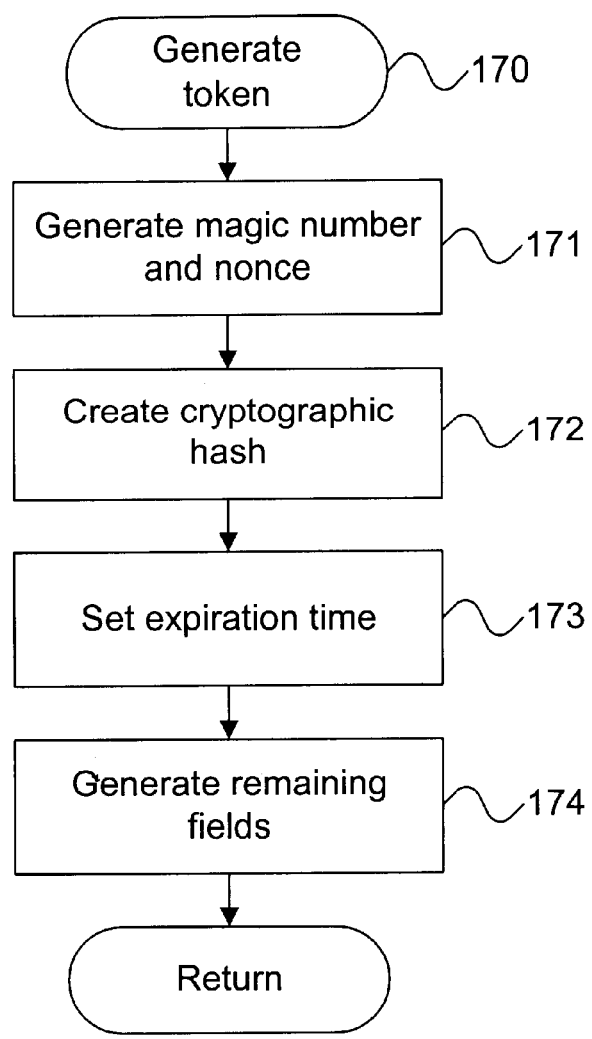
FIG. 11 is a flow diagram showing a routine for generating a token for use in the method of FIG. 9.

FIG. 11 is a flow diagram showing a routine for generating a token 170 for use in the method 110 of FIG. 9. The purpose of this routine is to generate a token 90 that uniquely identifies a request sent from a client. Each token 90 contains a magic number 91 (shown in FIG. 6) that is preferably selected randomly from a set of rotating values. These values are unique to each authentication system 63. As well, each token 90 contains a nonce value 93 that uniquely identifies the specific request to preclude replay attacks. Preferably, the nonce value 93 is cryptographically generated. The magic number 91 and nonce value 93 are generated (block 171). Next, the cryptographic hash 96 is created (block 172) based on the source and destination IP addresses and the protocol type. An expiration time 95 is set (block 173) to indicate the liveness of the request. Finally, any remaining fields in the token 90, such as the command 92 and key identifier 94 fields, are generated (block 174). The routine then returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for preventing a spoofed remote procedure call denial of service attack in a networked computing environment, comprising:
    a hierarchical protocol stack comprising a plurality of communicatively interfaced protocol layers with at least one protocol layer providing a client service via a remote procedure call interface;
    an authentication module, comprising:
        a packet module intercepting a request packet sent from a requesting client, the request packet containing a service request being sent to a remote server via a remote procedure call, forwarding the request packet and a token to the remote server indicated in the remote procedure call, and receiving a response packet containing a response sent from a remote server via the remote procedure call interface for the provided client service; and
        an identification module generating the token uniquely identifying the request packet using data contained therein and including the token with the request packet and determining whether the response packet includes a token uniquely identifying the response packet as having originated from the requesting client for the provided client service.

2. A system according to claim 1, further comprising:
    the identification module removing any such token included with the response packet where such token affirmatively identifies the response packet as having originated from the requesting client; and
    the packet module forwarding the response packet to the requesting client.

3. A system according to claim 2, further comprising:
    the identification module discarding the response packet where at least one of such token fails to identify the response packet as having originated from the requesting client and the response packet does not include a token.

4. A system according to claim 1, further comprising:
    the identification module associating a timeout variable with the token;

the packet module discarding the response packet where any such token included with the response packet has an expired associated timeout variable.

5. A system according to claim 1, further comprising:
    the identification module providing within the token an indication of keying material used in generating the token.

6. A system according to claim 1, further comprising:
    the identification module augmenting the request packet with the token, comprising at least one of inserting the token into a header of the request packet for at least one such protocol layer and appending the token onto the end of the request packet.

7. A system according to claim 6, further comprising:
    the identification module recalculating each such checksum included in the header of the request packet for each such protocol layer that includes a checksum.

8. A system according to claim 1, wherein the received request packet is selected from the group comprising an ICMP echo request, an ICMP timestamp request, and a DNS request.

9. A system according to claim 1, wherein the token includes a cryptographic checksum.

10. A system according to claim 1, wherein the token comprises a magic number, command value, nonce value, key identifier, expiration time, and hash value.

11. A system according to claim 1, wherein the hierarchical protocol stack complies with Transmission Control Protocol/Internet Protocol (TCP/IP).

12. A method for preventing a spoofed remote procedure call denial of service attack in a networked computing environment, comprising:
    defining a hierarchical protocol stack comprising a plurality of communicatively interfaced protocol layers with at least one protocol layer providing a client service via a remote procedure call interface;
    intercepting a request packet sent from a requesting client, the request packet containing a service request being sent to a remote server via a remote procedure call;
    generating a token uniquely identifying the request packet using data contained therein and including the token with the request packet;
    forwarding the request packet and the included token to the remote server indicated in the remote procedure call;
    receiving a response packet containing a response sent from a remote server via the remote procedure call interface for the provided client service; and
    determining whether the response packet includes a token uniquely identifying the response packet as having originated from the requesting client for the provided client service.

13. A method according to claim 12, further comprising:
    removing any such token included with the response packet where such token affirmatively identifies the response packet as having originated from the requesting client; and
    forwarding the response packet to the requesting client.

14. A method according to claim 13, further comprising:
    discarding the response packet where at least one of such token fails to identify the response packet as having originated from the requesting client and the response packet does not include a token.

15. A method according to claim 12, further comprising:
    associating a timeout variable with the token;

discarding the response packet where any such token included with the response packet has an expired associated timeout variable.

16. A method according to claim 12, further comprising:

providing within the token an indication of keying material used in generating the token.

17. A method according to claim 12, further comprising:

augmenting the request packet with the token, comprising at least one of:

inserting the token into a header of the request packet for at least one such protocol layer; and appending the token onto the end of the request packet.

18. A method according to claim 17, further comprising:

recalculating each such checksum included in the header of the request packet for each such protocol layer that includes a checksum.

19. A method according to claim 12, wherein the received request packet is selected from the group comprising an ICMP echo request, an ICMP timestamp request, and a DNS request.

20. A method according to claim 12, wherein the token includes a cryptographic checksum.

21. A method according to claim 12, wherein the token comprises a magic number, command value, nonce value, key identifier, expiration time, and hash value.

22. A method according to claim 12, wherein the hierarchical protocol stack complies with Transmission Control Protocol/Internet Protocol (TCP/IP).

23. A computer-readable storage medium holding code for preventing a spoofed remote procedure call denial of service attack in a networked computing environment, comprising:

defining a hierarchical protocol stack comprising a plurality of communicatively interfaced protocol layers with at least one protocol layer providing a client service via a remote procedure call interface;

intercepting a request packet sent from a requesting client, the request packet containing a service request being sent to a remote server via a remote procedure call;

generating a token uniquely identifying the request packet using data contained therein and including the token with the request packet;

forwarding the request packet and the included token to the remote server indicated in the remote procedure call;

receiving a response packet containing a response sent from a remote server via the remote procedure call interface for the provided client service; and determining whether the response packet includes a token uniquely identifying the response packet as having originated from the requesting client for the provided client service.

24. A storage medium according to claim 23, further comprising:

removing any such token included with the response packet where such token affirmatively identifies the response packet as having originated from the requesting client; and forwarding the response packet to the requesting client.

25. A storage medium according to claim 23, further comprising:

discarding the response packet where at least one of such token fails to identify the response packet as having originated from the requesting client and the response packet does not include a token.

26. A storage medium according to claim 23, further comprising:

associating a timeout variable with the token;

discarding the response packet where any such token included with the response packet has an expired associated timeout variable.

27. A storage medium according to claim 23, further comprising:

providing within the token an indication of keying material used in generating the token.

28. A storage medium according to claim 23, further comprising:

augmenting the request packet with the token, comprising at least one of:

inserting the token into a header of the request packet for at least one such protocol layer; and appending the token onto the end of the request packet.

29. A storage medium according to claim 23, further comprising:

recalculating each such checksum included in the header of the request packet for each such protocol layer that includes a checksum.

* * * * *